April 7, 1964 O. BEARDEN 3,127,982

TELETYPESETTER PERFORATOR ATTACHMENT

Filed March 15, 1962 2 Sheets-Sheet 1

Olen Bearden
INVENTOR.
BY Clarence A. O'Brien
and Harvey B. Jacobson
Attorneys

April 7, 1964 O. BEARDEN 3,127,982

TELETYPESETTER PERFORATOR ATTACHMENT

Filed March 15, 1962 2 Sheets-Sheet 2

Olen Bearden

INVENTOR.

BY Clarence A. O'Brien and Harvey B. Jacobson

Attorneys

United States Patent Office 3,127,982

Patented Apr. 7, 1964

3,127,982

TELETYPESETTER PERFORATOR ATTACHMENT

Olen Bearden, 1501 W. 27th, Pine Bluff, Ark.

Filed Mar. 15, 1962, Ser. No. 179,909
4 Claims. (Cl. 199—18)

This invention relates to a novel and useful attachment which is primarily designed to facilitate the back spacing of a Teletypesetter perforator which is normally provided with a back space key that may be actuated for back spacing the tape being perforated one space.

When utilizing a conventional form of Teletypesetter perforator such as the model 20 Teletypesetter perforator manufactured by Fairchild Graphic Equipment Company of Plainview, Long Island, New York, the tape with code perforations punched in lateral alignment is fed into an operating unit on a line casting machine, either a "Linotype" machine or an "Intertype" machine. The perforations on the tape are of course code perforations for designating the proper sequence of a predetermined number of letters in a line and as the model 20 perforator is used basically for newspaper work, the perforations on the tape must be divided into lines to fit into a column of predetermined width in a newspaper. The line must be within certain limitations known as the justification range. If the line is short of the justification range and the next word is too long and cannot be hyphenated or broken, the operator may turn back the tape and add extra space within the spacing codes already on the tape. This is known as the add thin operation because the extra space added with normal space is called a thin space matrix. If this does not bring the line into the justification range, then the entire line must be rubbed out and reset adding more spacing than can be added by the add thin operation. If the operator of the machine tries to put a word or part of a word on the end of a line and finds that it goes beyond the justification range, then the tape will have to be turned back and the entire line rubbed out. Then, the line will have to be reset and spaced in such a manner so as to bring it into the minimum side of the justification range without the last word or part of a word that had made the line too long previously.

Also, should the operator make a mistake by depressing the wrong key on the keyboard, the entire line should be rubbed out and reset. This is true because the counting mechanism counts a predetermined number of units for each character or each key of the keyboard as the key is depressed. Different letters of the alphabet have a different unit count than others. For example, the lowercase I is much thinner than the lowercase M and therefore the I would have a smaller unit count than the lowercase M. When a character or code perforation is rubbed out the counting pointer does not subtract those code perforations rubbed out and the operator must bear in mind the number of units which were rubbed out. Accordingly, the operators are sometimes forced to guess at the justification range. Therefore, if an error has been rubbed out, the entire line should be rubbed out and reset. The attachment of the instant invention is very useful in the aforementioned rubbing out operations, because it permits the tape to be turned back as far as needed without the use of a back space key or back space pawl. The back space key or back space pawl permits only one space for each depression of the key or pawl while the attachment of the instant invention permits the tape feed wheel assembly to be free-wheeled or turned back any number of spaces desired simply by turning the wheel assembly.

In the add thin operation mentioned heretofore, the attachment of the instant invention will permit the operator to turn back the tape to the space code perforation for the purpose of adding additional space to the already existing space without the aid of the back space pawl or back space key. The tape may be turned back as many positions as desired.

In the case of a long line or a line that the counting pointer goes beyond the justification range, the attachment of the instant invention allows the operator of the machine to turn back the tape with minimum effort and in a fraction of the time normally required to hold down the back space pawl with one hand and turn the back space tape with the other hand.

In summary, the present day perforators are provided with means for back spacing the tape only one position at a time. In the event it becomes necessary to backspace or to rub out a whole line, sequentially effecting individual back space operations is time consuming as the back space key must be depressed once for each position the drive wheel assembly of the perforator is back spaced unless the back space key is held down by one hand and the feed wheel assembly is turned back with the other hand. Otherwise, with one hand operating, it is necessary to depress the back space key numerous times.

The main object of this invention is therefore to provide a Teletypesetter perforator attachment which can be readily secured to existing Teletypesetter perforators and utilized in a manner to disengage the feed pawl of the perforator from the drive wheel assembly of the perforator automatically at all times other than those when the feed pawl is being utilized to advance the wheel assembly of the perforator.

A further object of this invention, in accordance with the preceding object, is to provide an attachment which is adjustable so as to enable adjustments to be made thereto in order to custom fit the attachment for each perforator to which it is secured.

A final object of this invention to be specifically set forth herein is to provide a Teletypesetter perforator back space facilitating attachment which will conform to conventional forms of manufacture, be of simple construction and automatic in operation so as to provide a device that will be economically feasible, long lasting and trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
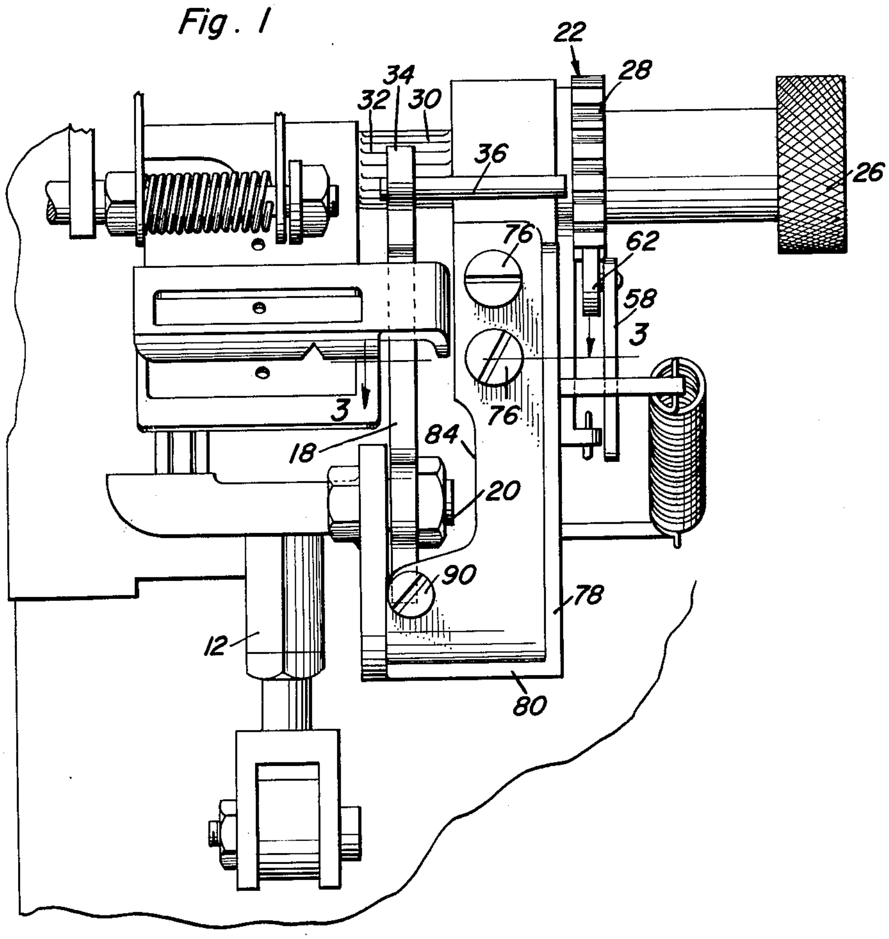
FIGURE 1 is a fragmentary elevational view of a portion of a conventional type of Teletypesetter perforator shown with the attachment of the instant invention mounted thereon.

Referring now more specifically to the drawings the numeral 10 generally designates a conventional type of Teletypesetter perforator such as the model 20 perforator manufactured and sold by Fairchild Graphic Equipment Company, of Plainview, Long Island, New York.

The perforator 10 includes a punch hammer plunger 12 which is actuated by means of suitable cam means (not shown) and a punch control hammer 14 is operatively connected to the hammer plunger 12. Each time the punch hammer 14 is actuated, the punch extension 16 to which the elongated tape feed pawl 18 is secured, is also actuated. The tape feed pawl 18 is pivotally secured to the punch extension 16 by means of an eccentric screw 20 whereby the axis of rotation of the tape feed pawl 18 may be adjusted. The tape feed pawl 18 extends generally vertically and is reciprocated along its longitudinal axis upon actuation of the punch hammer 14. A drive wheel assembly generally referred to by a reference numeral 22 is rotatably supported from the frame 24 of the machine 10 and includes a knurled knob 26, a star wheel 28 and a ratchet portion 30 having ratchet teeth 32 formed thereon. The tape feed pawl 18 includes a hooked end portion 34 which is disposed in engagement with the ratchet teeth 32 of the ratchet wheel portion 30 and the tape feed pawl 34 includes a transverse pin 36 which may be engaged by the back space pawl cam portion 38 carried by the back space pawl 40. The back space pawl 40 includes a lever arm portion 42 which is received in a socket 44 formed in the back space lever 46 and a pivoted pawl or abutment 48 is carried by the back space lever 46 for engagement with the star wheel 28 to effect back spacing of the wheel assembly 22 one position each time the back space lever 46 is depressed. It will be noted that the back space lever 46 is supported from the frame 24 by means of fasteners 49 and 50 whose shank portions are received in the slots 52 and 54 formed in the back space lever 46.

The recess 56 formed in the punch extension 16 has been provided for a reason to be more fully hereinafter set forth and it will be seen that a detent arm 58 is pivotally supported at one end from the frame 24 by pivot fasteners 60 and is provided with a roller 62 on its other end for engagement with the star wheel 28.

Figures 2, 4:
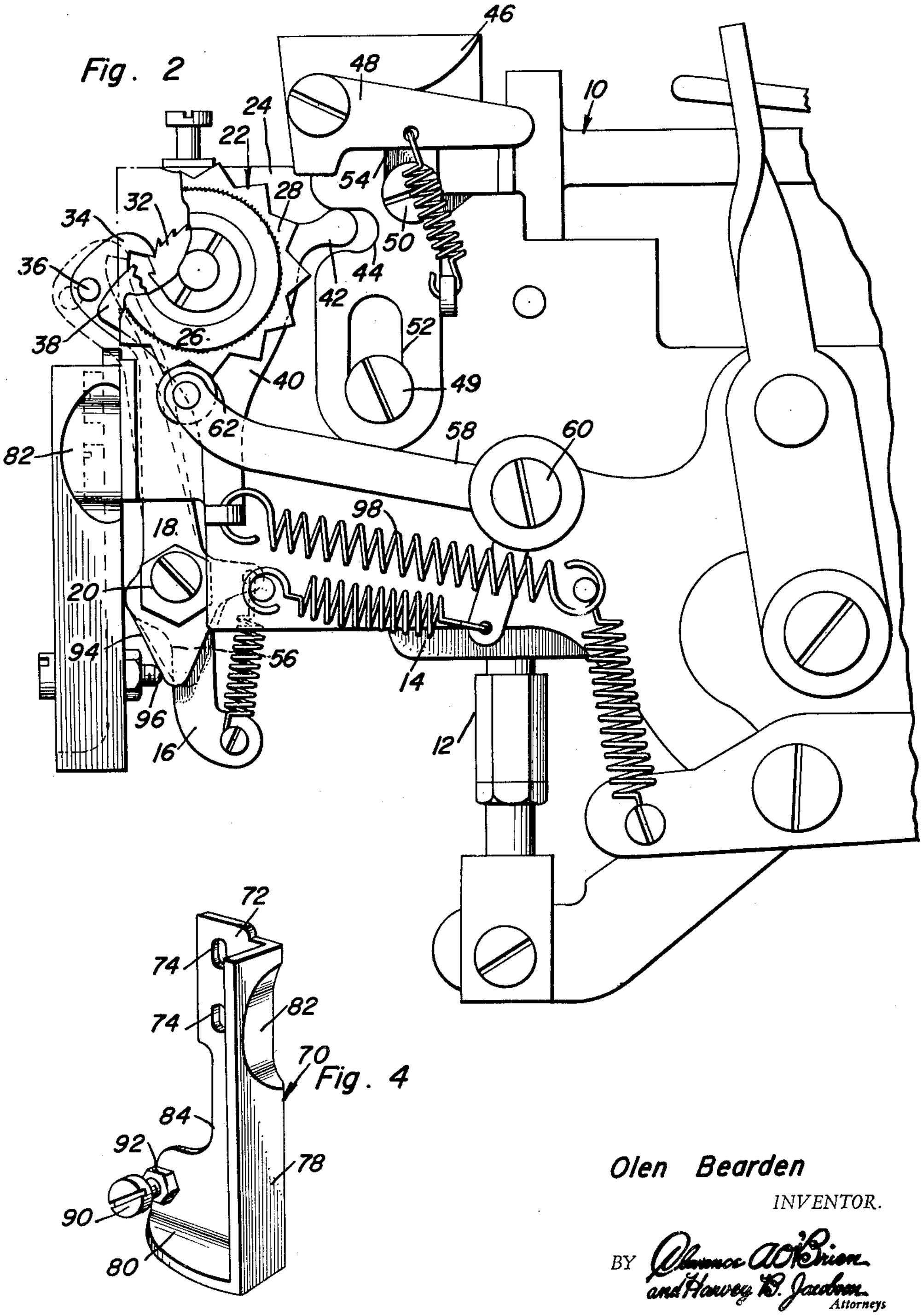
FIGURE 2 is a side elevational view of the embodiment illustrated in FIGURE 1 and seen from the right side of FIGURE 1.
FIGURE 4 is a perspective view of the attachment.

In normal operation of the perforator 10, the punch hammer 14 is actuated by means of the punch hammer plunger 12 and the tape feed pawl 18 is reciprocated longitudinally each time the punch hammer 14 is actuated to advance the hook end portion 34 thereof one tooth 32 on the ratchet wheel portion 30. Each time the ratchet wheel portion 30 is advanced one tooth, the roller 62 carried by the detent arm 58 will maintain the star wheel 28 and thus the wheel assembly 22 in its advanced position. Each time the tape feed pawl 18 is raised, the hook portion 34 slides over the next tooth 32 and engages the upper portion thereof. Then, as the tape feed pawl 18 is lowered, the ratchet wheel portion 30 is advanced in a counterclockwise direction as seen in FIGURE 2 of the drawings. However, the tape feed pawl 18 remains engaged with the ratchet wheel portion 30 thereby preventing the ratchet wheel from being rotated in a reverse direction, clockwise as viewed in FIGURE 2 of the drawings. However, the back space lever 46 may be depressed which in turn effects clockwise rotation of the back space pawl 40 whose cam portion 38 engages the pin 36 to pivot the hooked portion 34 of the tape feed pawl 18 out of engagement with the ratchet wheel portion 30. At the same time, the lever portion 48 is lowered into engagement with the tooth wheel 28 whereby it may be rotated in reverse one position. Accordingly, it may be seen that if the wheel assembly 22 is to be back spaced fifteen positions by a one handed operation, the back space lever 46 will have to be depressed fifteen times. This of course is time consuming.

Figure 3:
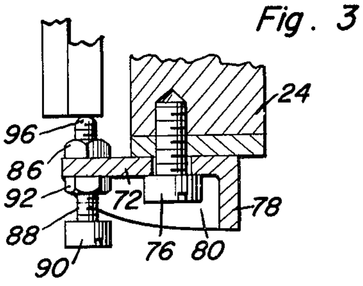
FIGURE 3 is a fragmentary horizontal sectional view taken substantially upon the plane indicated by section line 3—3 of FIGURE 1 and showing the manner in which the attachment is secured to the perforator and the manner in which it engages the tape feed pawl of the perforator.

With attention now directed to FIGURES 2–4 of the drawings in particular, it will be seen that the attachment of the instant invention is generally designated by the reference numeral 70. The attachment 70 includes a mounting plate portion 72 which is provided with suitable elongated openings 74 for the reception of fasteners 76 to secure the plate portion 72 to the frame 24.

The plate portion 72 includes a right angle flange 78 along one side thereof and thereby making the plate portion 72 very rigid. In addition, a right angled end flange 80 interconnects the lower ends of the plate portions 72 and the flange 78.

As can probably best be seen from FIGURE 4 of the drawings, the flange 78 is provided with a recessed portion 82 and the plate portion 72 is provided with a recess 84. The lower end of the plate portion 72 is apertured and has a nut 86 secured thereto in any convenient manner such as by welding with the nut 86 aligned with the aperture. The shank portion 88 of a headed screw 90 which is constructed of hardened metal is received through the aperture formed in the plate portion 72 and threadedly engaged in the nut 86. In addition, a jam nut 92 is threadedly engaged on the shank portion 88 and is disposed in tight frictional engagement with the plate portion 72 to retain the screw 90 in adjusted position.

From FIGURES 2 and 3 of the drawings it may be seen that the attachment 70 has the plate portion 72 thereof secured to an end face of the frame 24 by means of the fasteners 76. In addition, it may be seen that the lower end of the tape feed pawl 18 disposed below the pivot end or screw 20 is provided with an inclined cam surface 94 which is inclined relative to the direction of reciprocation of the feed pawl and is disposed in a plane generally paralleling the axis of rotation of the feed pawl. As the free end of the shank portion 88 is disposed in axial alignment with the cam surface 94 and the attachment 70 remains stationary while the tape feed pawl 18 is reciprocated relative thereto, as the tape feed pawl returns to its lowermost rest position, the abutment 96 formed by the free end of the shank portion 88 will engage the cam surface 94 whereupon the upper end of the tape feed pawl 18 will be pivoted away from the ratchet wheel portion 30 to the position illustrated in phantom lines in FIGURE 2 of the drawings. Accordingly, it may be seen that the tape feed pawl, by means of the attachment 70, will be maintained in a position out of engagement with the ratchet wheel portion 30 at all times other than those times during which the tape feed pawl 18 is being utilized to advance the ratchet wheel portion 30. Accordingly, at any time that the tape feed pawl 18 is disposed in its rest position, the knurled knob 26 may be grasped in order to turn the wheel assembly 22 at any number of positions as desired.

Therefore, it may be seen that the attachment of the instant invention greatly increases the operating speed of the machine 10 and performs a very important function without which the perforator 10 was relatively slow in some phases of operation.

The recssed portion 82 is provided for providing clearance for the lower end of the back space pawl 40 to which the expansion spring 98 is secured. In addition, the recess 84 will provide clearance for the pivot pin 20 and its eccentric mount.

The recess 56 is provided to insure that the end of the shank portion 88 which engages the cam surface will be provided sufficient clearance. The recess 56 may be formed by grinding material from the punch extension 16 in order to form the recess 56. The recess 84, however, is formed to provide clearance for the portions of the punch extension 16 and tape feed pawl 18 disposed closest to that portion of the plate portion 72 in which the recess 84 is formed, see FIGURES 1 and 2.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination, a Teletypesetter perforator of the type including a rotatable toothed drive wheel assembly for driving engagement with the tape to be perforated and provided with ratchet teeth for engagement by one end of an elongated tape feed pawl pivotally supported at its other end portion from a reciprocating portion of the drive mechanism of said perforator for intermittently advancing said wheel assembly one position each time said reciprocating portion completes a reciprocating cycle, said perforator also including detent means yieldably retaining said wheel in intermittently advanced positions of rotation and a cam and single backspace pawl assembly for sequentially camming said feed pawl out of engagement with said ratchet teeth and backing said wheel assembly one position, said feed pawl including a cam surface inclined relative to the direction along which said reciprocating portion is reciprocated and disposed in a plane generally paralleling the axis of rotation of said feed pawl, a back spacing facilitating attachment, said attachment comprising a mounting bracket, an abutment carried by said bracket, means securing said bracket on said perforator with said abutment in alignment with the reciprocating movement of said cam surface, said cam surface engaging said abutment upon said completion of each of said reciprocating cycles of said reciprocating portion to cam said feed pawl out of engagement with said ratchet teeth after each advancement of said wheel assembly whereby said wheel assembly may be manually backed a plurality of positions at one time while said feed pawl remains out of engagement with said ratchet teeth.

2. The combination of claim 1 wherein said abutment is adjustable laterally of said plane and transversely of the line along which said reciprocating portion is reciprocated.

3. The combination of claim 1 wherein said bracket includes a mounting plate, said abutment comprising an abutment screw whose shank portion is screw threadedly engaged with said plate and projects laterally from one side of said plate toward said cam surface.

4. The combination of claim 3 including lock nut means threadedly engaged with said shank portion and engageable with said plate for locking said shank portion in adjusted positions relative to said plate.

References Cited in the file of this patent

UNITED STATES PATENTS

| | | |
|---|---|---|
| 701,096 | Shimer | May 27, 1902 |
| 808,873 | Rogers | Jan. 2, 1906 |
| 954,843 | Woodward | Apr. 12, 1910 |
| 2,098,973 | Reiber | Nov. 16, 1937 |
| 2,156,371 | Buschmann | May 2, 1939 |

UNITED STATES PATENT OFFICE

CERTIFICATE OF CORRECTION

Patent No. 3,127,982 April 7, 1964

Olen Bearden

It is hereby certified that error appears in the above numbered patent requiring correction and that the said Letters Patent should read as corrected below.

In the heading to the sheets of drawings and in the heading to the printed specification, title of invention, for "TELETYPESETTER PERFORATOR ATTACHMENT", each occurrence, read -- TYPESETTER PERFORATOR ATTACHMENT --; column 1, lines 14 to 16, strike out "model 20 Teletypesetter perforator manufactured by Fairchild Graphic Equipment Company of Plainview, Long Island, New York" and insert instead -- 200 Series manufactured by the Fairchild Camera Instrument Corporation --; column 2, lines 66 to 68, strike out "model 20 perforator manufactured and sold by Fairchild Graphic Equipment Company, of Plainview, Long Island, New York" and insert instead -- 200 Series manufactured by the Fairchild Camera and Instrument Corporation --.

Signed and sealed this 9th day of February 1965.

(SEAL)
Attest:

ERNEST W. SWIDER
Attesting Officer

EDWARD J. BRENNER
Commissioner of Patents